US012737761B2

(12) United States Patent
Rosas-Maxemin et al.

(10) Patent No.: US 12,737,761 B2
(45) **Date of Patent: *Sep. 15, 2026**

(54) SYSTEMS AND METHODS FOR SECURE COMMUNICATIONS VIA BLOCKCHAIN FOR USE IN IMAGE-BASED PARKING SYSTEMS

(71) Applicant: Pied Parker, Inc., Sacramento, CA (US)

(72) Inventors: Gianni Rosas-Maxemin, Sacramento, CA (US); Robert Mazzola, Sacramento, CA (US); Rishi Kumar, Sacramento, CA (US); Callam Poynter, Sacramento, CA (US); George Azzi, Sacramento, CA (US); Joseph Ricard, Miami, FL (US)

(73) Assignee: Pied Parker, Inc., Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/728,499

(22) PCT Filed: Jan. 13, 2023

(86) PCT No.: PCT/US2023/060677

§ 371 (c)(1),
(2) Date: Jul. 12, 2024

(87) PCT Pub. No.: WO2023/137459

PCT Pub. Date: Jul. 20, 2023

(65) Prior Publication Data

US 2025/0139621 A1 May 1, 2025

Related U.S. Application Data

(60) Provisional application No. 63/299,396, filed on Jan. 13, 2022.

(51) Int. Cl.
*G06Q 20/40* (2012.01)
*G06V 20/52* (2022.01)
*H04L 9/00* (2022.01)

(52) U.S. Cl.
CPC ............. *G06Q 20/401* (2013.01); *H04L 9/50* (2022.05); *G06Q 2240/00* (2013.01); *G06V 20/52* (2022.01); *G06V 2201/08* (2022.01)

(58) Field of Classification Search
USPC .......................................................... 705/13
See application file for complete search history.

(56) References Cited

U.S. PATENT DOCUMENTS 7,194,330 B2 3/2007 Carson
10,216,948 B2 * 2/2019 Leporini ................ H04L 63/08
(Continued)

FOREIGN PATENT DOCUMENTS

CN 110610610 A * 12/2019 ........... G08G 10/137
CN 108922231 B * 1/2021 ......... G06Q 20/3829

OTHER PUBLICATIONS

"PureParking: A Decentralized, Secure Framework for Parking Space Sharing using Blockchain," by Adnan Md Tayeb, Md Mahinur Alam, Mst Ayesha Khatyn, (2024) (Year: 2024).*

(Continued)

*Primary Examiner* — Michael P Harrington
*Assistant Examiner* — Brian Adams Heflin
(74) *Attorney, Agent, or Firm* — Straylight LLP

(57) ABSTRACT

The present disclosure generally relates to blockchain technology and, more specifically, to improved systems and methods of establishing, supporting and securing image-based parking recognition and navigation communications via blockchain systems. In some aspects, the present disclosure provides a process for collecting, using one or more session border controllers (SBCs) and one or more cameras, (Continued)

a set of vehicle data wherein the set of vehicle data comprises one or more unique identification features corresponding to one or more vehicles and wherein the one or more vehicles are located in a parking facility. In some cases, the process can further include steps for establishing, using the one or more SBCs and the one or more cameras, a private blockchain wherein the one or more cameras serve as nodes in the private blockchain and wherein the one or more cameras serve as a gateway for the one or more session border controllers.

18 Claims, 7 Drawing Sheets

(56) References Cited

U.S. PATENT DOCUMENTS

| | | | | |
|---|---|---|---|---|
| 2015/0294286 | A1* | 10/2015 | Grote | G06Q 20/322 705/13 |
| 2018/0078843 | A1 | 3/2018 | Tran et al. | |
| 2019/0266561 | A1* | 8/2019 | Koeppel | G06Q 20/3224 |
| 2020/0219390 | A1* | 7/2020 | Lyles | G07B 15/02 |
| 2020/0234590 | A1* | 7/2020 | Ma | G06Q 10/06398 |
| 2020/0349617 | A1* | 11/2020 | Rosas-Maxemin | G06N 20/00 |
| 2020/0366671 | A1 | 11/2020 | Larson et al. | |
| 2020/0410246 | A1* | 12/2020 | Ramirez | G06F 18/22 |
| 2021/0240498 | A1 | 8/2021 | Padmanabhan et al. | |
| 2023/0343114 | A1* | 10/2023 | Gupta | G06V 20/54 |
| 2024/0054518 | A1* | 2/2024 | Saravia | G06Q 30/0215 |
| 2024/0202719 | A1* | 6/2024 | Poschke | H04W 12/047 |
| 2025/0014346 | A1* | 1/2025 | Jeong | G06Q 50/40 |

OTHER PUBLICATIONS

"Parking is Dead. Long Live Parking," by Katina Stefanova, Jul. 15, 2020, (hereinafter Dead) (Year: 2020).*

International Search Report and Written Opinion dated May 1, 2023 in corresponding PCT Application No. PCT/US2023/060677 in 11 pages.

Muhammad Fayez Afzaal et al., 'Blockchain based Automated Formal Model for Safety and Security in Smart Parking System', In: 2019 4th International Conference on Emerging Trends in Engineering, Sciences and Technology (ICEEST), Feb. 6, 2020, Abstract.

Hans L. Cycon et al., 'Connecting the worlds: Multipoint videoconferencing integrating H.323 and IPv4, Sip and IPv6 with autonomous sender authentication', In: 2009 IEEE 13th International Symposium on Consumer Electronics, Jul. 6, 2009, pp. 890-893, Abstract.

* cited by examiner

SYSTEMS AND METHODS FOR SECURE COMMUNICATIONS VIA BLOCKCHAIN FOR USE IN IMAGE-BASED PARKING SYSTEMS

CROSS-REFERENCE TO RELATED APPLICATIONS

This application is a U.S. National Phase of International Application No. PCT/US2023/060677, filed Jan. 13, 2023, which claims priority to U.S. Provisional Application No. 63/299,396, filed on Jan. 13, 2022, the contents of which are incorporated herein by reference in their entireties.

BACKGROUND

1. Technical Field

The present disclosure relates generally to blockchain technology and, more specifically, to improved systems and methods of establishing, supporting and securing image-based parking recognition and navigation communications via blockchain systems and infrastructure.

2. Introduction

Parking a vehicle in densely populated environments is often a frustrating and time-consuming experience, with few available parking spaces and major street congestion. Using parking applications, smartphone owners may use on-demand parking systems to pay property owners for use of their parking spaces. However, applications rely on user input to determine arrival and departure times of vehicles in parking spaces, or on expensive sensors in those parking spaces for which there is often unreliable data about the inventory available. With traditional booking systems, a user may search for street parking and/or parking facilities and find out whether parking is available and pay for parking manually upon arrival. These systems may require expensive, inaccurate hardware and physical paper tickets for verifying payment, and do not provide any advanced notice of availability or payment before arrival. These systems often require manual input of all, or most information associated with creating a new user account, which can lead to increased traffic at an entrance to a parking facility. These systems are outdated, slow, and inaccurate. Blockchain is an innovative technology that overcomes security threats and allows decentralization of sensitive operations while preserving a high level of security. It eliminates the need for trusted intermediaries. The blockchain is accessible to all network nodes and keeps track of all transactions already made

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
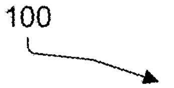
FIG. 1 illustrates an example system of a distributed computing system, according to some examples of the present disclosure.
Figure 1:
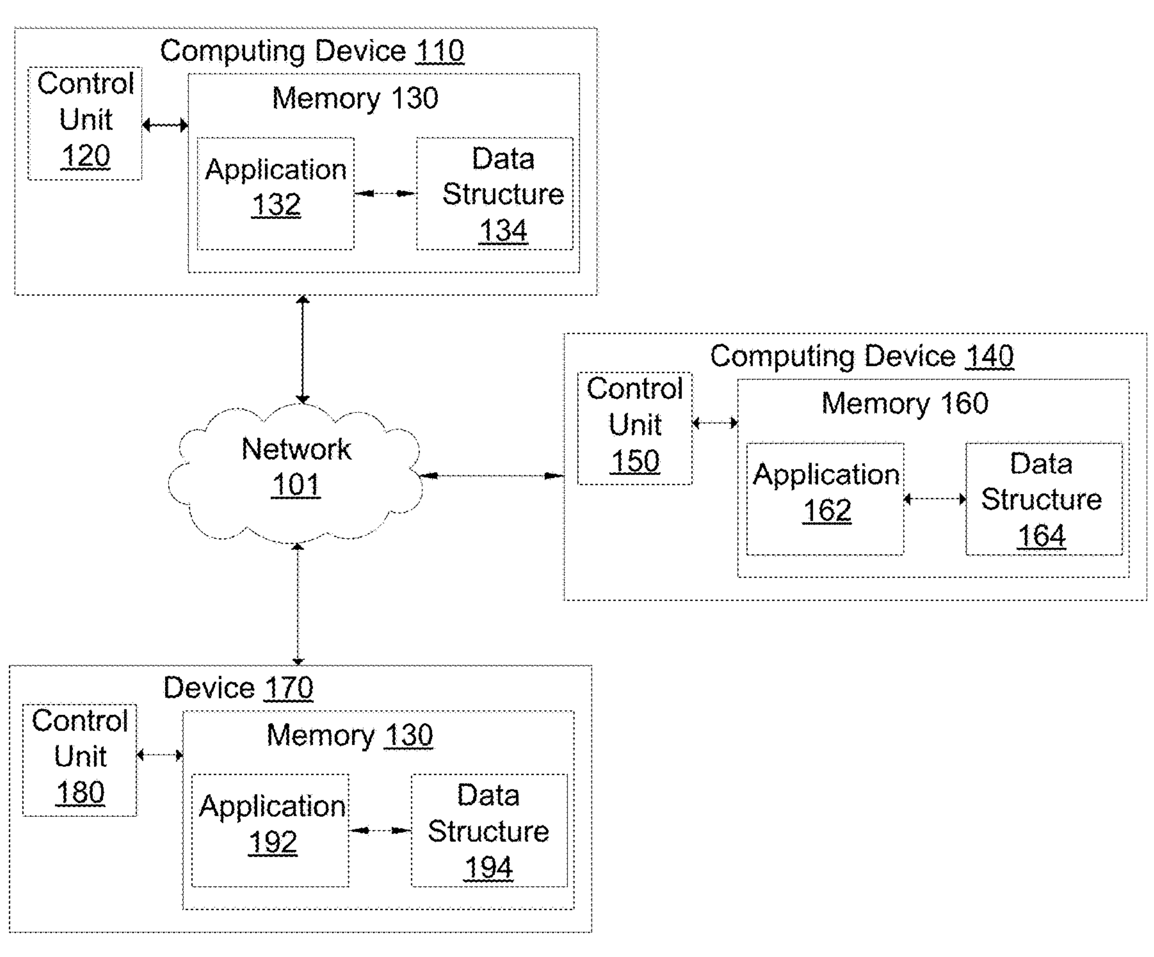

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Decentralized networks such as blockchain may not store information in one centralized location, which may make it challenging for cybercriminals to hack them. In some cases, when information is recorded in a blockchain's distributed ledger it may not be removed, changed, relocated or tampered with in any way. Consequently, attacking one central server can no longer be enough to gain control over the entire system and a decentralized network may create a transparent and secure framework with vast implications.

In light of the problems associated with traffic and parking, it would be desirable to provide improved methods and systems of detecting and paying for parking spaces and providing vehicles and users with options to automatically reserve and navigate to parking spaces. The foregoing problems may be addressed by aspects of the subject technology that may provide systems and methods for identifying available parking spaces based on image data, receiving a search request for a parking space, and securing a parking space for a vehicle based on the search request. Furthermore, it may be beneficial to have a parking system with a network of computing systems and cameras securely communicating using blockchain technology. In practice, suppose that a vehicle is looking for parking and searches for parking using a wireless device application (e.g., such as PIED PARKER application) that enables online payment for parking reservations. The wireless device may receive a notification or other message once it is close to a parking facility. In addition, the notification (e.g., notification from the application) may include a link to open up an application that enables such online payment for parking transactions. In some cases. if the parking application is already downloaded, information about the user may be used to autocomplete parameters for a parking space request that may be automatically transmitted by the wireless device. This request may be sent to the parking application servers which process the transaction.

In some examples, once it is determined that a vehicle is looking for parking, image data gathered from multiple sources may be used to identify available parking spaces. The image data may be captured from cameras on other vehicles, cameras in a parking facility or along a street, and other parking sensors. The image data may be processed using machine learning algorithms, which may be trained to detect particular parking features, such as the presence or absence of a vehicle. Based on a recognition of the image and location information, the particular parking space in the image may be determined, for instance, by comparing information about the parking space with parking spaces in databases of parking spaces. In some cases, a particular parking space may be a metered parking space or within a parking facility. In some instances, using an application (e.g., such as the PIED PARKER application), the particular parking space may be reserved for the vehicle. In some examples, payment may be facilitated for the parking space, such as a telephonic payment for a meter or payment for the parking space on an application using stored payment information. Instructions may be sent to the wireless device to provide for navigation to the parking space. In some cases, a driver of a vehicle may need to only confirm the parking space reservation when prompted, and a suitable parking space may be identified based on stored preferences and payment facilitated with little to no input from the driver, and then the driver may be directed to the parking space. In some aspects, upon entering and/or leaving a parking facility, a driver may receive a notification on their wireless device with the short-range wireless communication technology enabled. Opening the notification may open the parking application to allow the user to enter and/or exit the parking facility. In some aspects, the user may have set preferences to automatically confirm entrance and/or exit via the wireless device with or without prompt. In some examples, the parking application may send back verification of the reservation, or the user may complete the verification for the parking space to be reserved within the parking facility. In some cases, the user may not have access to a data network upon entering the parking facility, and the parking space may be paid once a data network is available. In some instances, intelligent parking systems can increase efficiency with respect to parking, facilitate autonomous parking of vehicles, reduce traffic, reduce accidents, diminish or eliminate the need for vehicle operator (e.g., a user) input, more accurately predict parking needs, increase security, and lead to faster processing of parking transactions. By shortening the time spent looking for parking for vehicles, less cars may be on the road looking for parking which may significantly decrease traffic (e.g., traffic within a parking structure). Furthermore, intelligent parking systems can decrease walking distance for users from their parking spot to their destination and decrease costs associated with parking.

Examples of the systems and techniques described herein are illustrated in FIG. 1 through FIG. 7 and described below.

FIG. 1 illustrates an example system of a distributed computing system 100, according to some examples of the present disclosure. As shown in FIG. 1, system 100 may include three computing devices 110, 140, and 170. One of ordinary skill in the art would appreciate that distributed computing system 100 may include any number of computing devices of various types and/or capabilities. In some aspects, computing devices 110, 140, and/or 170 may be any type of computing device including personal computers (e.g., laptop, desktop, smartphone, or tablet computers), servers (e.g., web servers, database servers), network switching devices (e.g., switches, routers, hubs, bridges, and/or the like), vehicle-based devices (e.g., on-board vehicle computers, short-range vehicle communication systems, telematics devices), or mobile communication devices (e.g., mobile phones, portable computing devices, and/or the like), and/or the like, and may include some or all of the elements previously mentioned.

In some aspects, computing device 110 includes a control unit 120 coupled to memory 130; computing device 140 includes a control unit 150 coupled to memory 160; and computing device 170 includes a control unit 180 coupled to memory 190. Each of control units 120, 150, and/or 180 may control the operation of its respective computing device 110, 140, and/or 170. In some examples, control units 120, 150, and/or 180 may each include one or more processors, central processing units (CPUs), graphical processing units (GPUs), virtual machines, microprocessors, microcontrollers, logic circuits, hardware finite state machines (FSMs), digital signal processors (DSPs) application specific integrated circuits (ASICs), field programmable gate arrays (FPGAs), and/or the like and/or combinations thereof. In some examples, memory 130 may be used to store one or more applications and one or more data structures, such as an application 132 and data structure 134. In some examples, memory 160 may be used to store one or more applications and one or more data structures, such as an application 162 and data structure 164, and memory 190 may be used to store one or more applications and one or more data structures, such as an application 192 and data structure 194. In some aspects, memories 130, 160, and/or 190 may each include one or more types of machine-readable media, including volatile and non-volatile memory. Some common forms of machine-readable media may include floppy disk, flexible disk, hard disk, magnetic tape, any other magnetic medium, CD-ROM, any other optical medium, punch cards, paper tape, any other physical medium with patterns of holes, ROM, PROM, EPROM, FLASH-EPROM, any other memory chip or cartridge, and/or any other medium from which a processor or computer is adapted to read. Some common forms of volatile memory include SRAM, DRAM, IRAM, and/or any other type of medium which retains its data while devices are powered, potentially losing the memory when the devices are not powered.

The data structures 134, 164, and/or 194 may vary in size, usage, and/or complexity depending upon the purposes of computing devices 110, 140, and/or 170 and/or applications 132, 162, and/or 192. In some aspects, when computing devices 110, 140, and/or 170 are network switching devices, such as switches, routers, hubs, bridges, and/or the like, the data structures 134, 164, and/or 194 may include one or more tables with forwarding and/or similar information. In some examples, these tables may include one or more virtual local area network (LAN) tables, link aggregation group (LAG) tables, layer 2 (L2) next hop tables, layer 3 (L3) routing tables, L3 forwarding information bases (FIBs), flow tables, and/or the like. Depending upon the networking environment of system 100 and/or the role of computing devices 110, 140, and/or 170 these tables may include anywhere from a few dozen entries to thousands, or even tens of thousands or more entries. In some examples, data from data structures 134, 164, and/or 194 may be retrieved, stored, or modified by a respective control unit in accordance with instructions which may be executed directly, e.g., machine code, or indirectly, e.g., scripts, by the respective control unit. The systems and methods of the present disclosure are not limited to any particular data structure.

In some aspects, computing devices 110, 140, and 170 may also be coupled together using a network 101. In some examples, one or more of computing devices 110, 140, and 170 may be connected via any type of wired or wireless connections, such as dedicated short-range communications (DSRC), satellite, fire wire, network, USB, Wi-Fi, radio-frequency identification (RFID), BLUETOOTH, GPS, Near Field Communication (NFC), Infrared (e.g., GSM infrared), and/or the like and/or using any suitable wireless communication standards and protocols, such as IEEE 802.11 and WiMAX. Network 101, including any intervening nodes, may be any kind of network including a local area network (LAN) such as an Ethernet, a wide area network (WAN) such as an internet, a virtual or non-virtual private network, and/or the like and/or combinations thereof.

In some aspects, network 101 may include any type of computing device including personal computers (e.g., laptop, desktop, smartphone, or tablet computers), servers (e.g., web servers, database servers), network switching devices (e.g., switches, routers, hubs, bridges), vehicle-based devices (e.g., on-board vehicle computers, short-range vehicle communication systems, telematics devices), or mobile communication devices (e.g., mobile phones, portable computing devices), and/or the like, and may include some or all of the elements previously mentioned. Computing devices 110, 140, and 170 through their applications, such as applications 132, 162, and/or 192, may use network 101 to exchange information and/or to provide services for each other. In some examples, computing device 140 may be used to provide backup and/or fail over services for computing device 110. In some examples, computing device 140 may be maintaining data structure 164 as a synchronized copy of data structure 134. In some examples, one or more of components of computing devices 110, 140, and 170, such as a control unit, may be located remotely.

In some aspects, computing devices 110, 140, and/or 170 may include an electronic display, the display may be an active matrix emitting diode (AMOLED), light-emitting diode (LED), organic LED (OLED), electrophoretic, liquid crystal, e-paper, and/or the like and/or combinations thereof.

In some aspects, computing devices 110, 140, and/or 170 may include various input and output (I/O) devices, such as a keyboard, a mouse, touchscreen, button inputs, microphone, motion sensor, eye sensor, video display, and/or the like.

Figure 2:
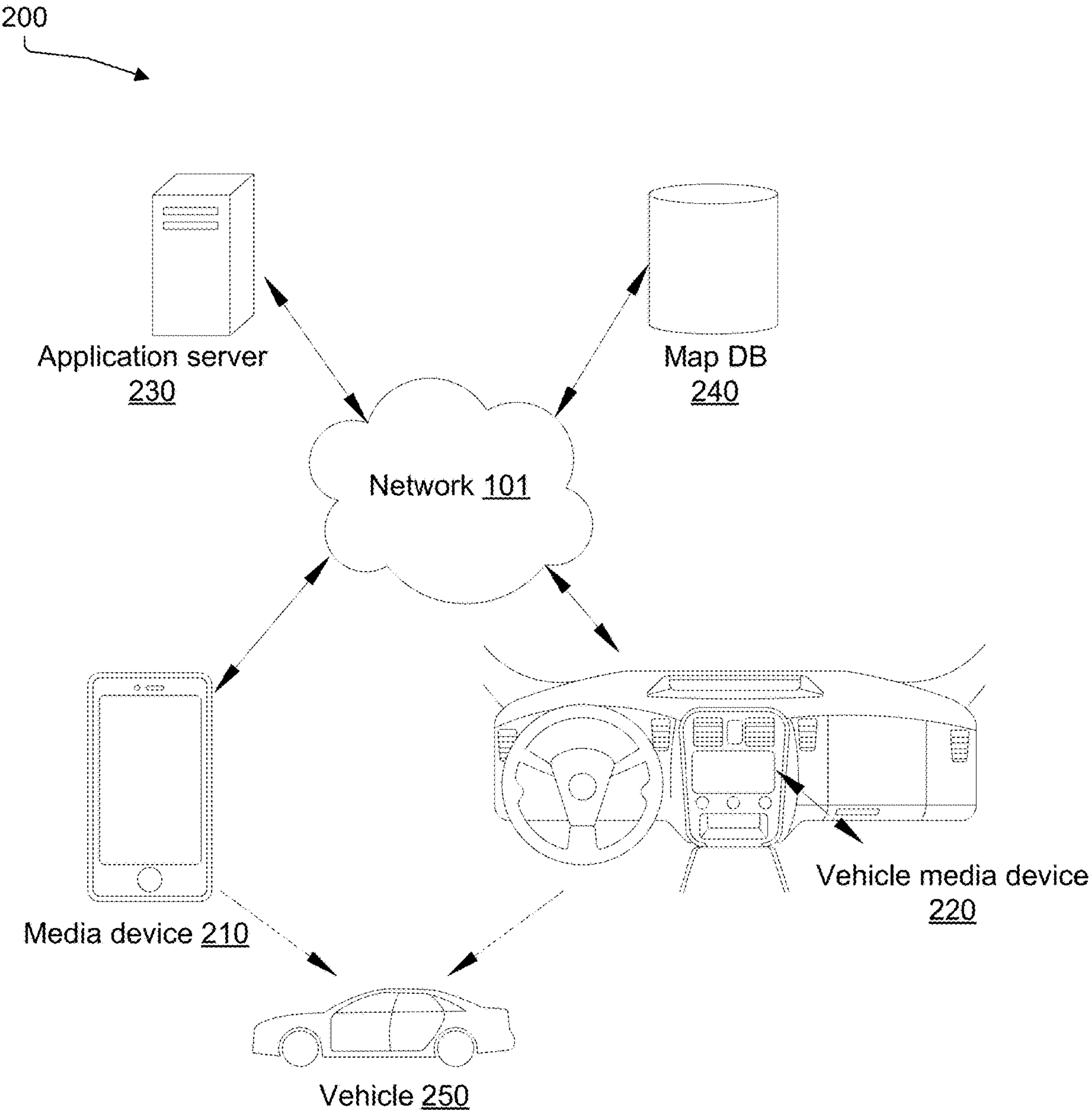
FIG. 2 illustrates an example system of a distributed computing network, according to some examples of the present disclosure.

FIG. 2 illustrates an example system 200 of a distributed computing network, according to some examples of the present disclosure. In some aspects, as shown in FIG. 2, system 200 includes wireless device 210, vehicle device 220, application servers 230, map database 240, and vehicle 250. In some examples, media device 210 and/or vehicle device 220 may correspond to one or more of computing devices 110, 140, 170 and may be in communication with one another using network 101.

In some aspects, vehicle device 220 may be a device within vehicle 250, or may be part of the vehicle itself, such as an on-board vehicle computer. The vehicle may have more than one computing device. In some examples, vehicle device 220 may be mounted inside a vehicle, such as mounted to a dashboard of the vehicle. In some examples, the vehicle may be any type of vehicle, including a sedan, truck, SUV, motorcycle, scooter, self-balancing scooters (e.g., a SEGWAY), hoverboard, drone, bus, golf cart, train, trolley, amusement vehicle, recreational vehicle, boat, watercraft, helicopter, airplane, bicycle, and/or the like.

In some aspects, wireless device may include a display within a housing. In some examples, the housing may include several parts. In some examples, one part of the housing may include an optically transparent material, such as glass, and another part of the housing may include other materials, such as metallic materials (e.g., aluminum), and/or plastic, which may provide a robust support structure to prevent deformation of the display.

In some aspects, vehicle device 220 may establish communication with wireless device 210, or vice versa. In some examples, wireless device 210 automatically establishes communication with vehicle device 220, such as by connections between one or more of computing devices 110, 140, and 170. In some examples, wireless device 210 is automatically in communication with vehicle device 220 via wired connection. In some examples, wireless device 210 may contain its own power supply, or may be powered by a power supply within vehicle 250. In some examples, vehicle may charge wireless device 210 while in operation. In some examples, wireless device 210 may be charged wirelessly, e.g., on a wireless charging surface, such as on a dashboard of vehicle 250. Vehicle 250 may contain a transmitter for providing energy transmission and wireless device 210 may have a receiver for wireless power, whereby energy transfer occurs using magnetic resonant coupling. The transmitter may transmit power using multiple transmit coils and using parallel paths from such coils to multiple receive coils in the receiver.

In some aspects, vehicle device 220 and/or wireless device 210 may have access to a data repository including a sensor data structure, map database 240, a vehicle dynamics data structure, a listing location data structure, or historical data structure. In some examples, a listing location may include any location that is made available (e.g., advertised) on a software application or is associated with a location made available, the location made available includes any real estate that is available for temporary licensing, leasing, renting, occupation of one or more vehicle parking locations, and/or the like, including a lot, garage (commercial or residential), and/or other location with a space suitable for occupation, including parking for a vehicle such as vehicle 250. In some examples, the sensor data structure may include information about available sensors, identifying information for the sensors, address information, internet protocol information, identifiers, data format, protocol used to communicate with the sensors, or a mapping of information type to sensor type or identifier. The sensor data structure may further include, or store information collected by sensors, such as timestamps date stamps, and/or location stamps. The sensor data structure may categorize the sensor data based on one or more characteristics of listing locations. In some aspects, the vehicle dynamics structure can include vehicle dynamics information collected by vehicle device 220 and one or more sensors of vehicle 250. The listing location data structure can include listing location information about all listing locations and associated parameters.

In some aspects, vehicle 250 may be remotely controlled, may be partially or totally autonomous, such as partially or totally autonomous vehicle systems and methods disclosed in U.S. Pat. No. 9,330,571, which is incorporated by reference in its entirety. In some examples, vehicle 250 may contain one or more vehicle operation sensors. In some examples, wireless device 210 and vehicle device 220 may be included as vehicle operation sensors and may be configured to communicate with one or more external sensors. External sensors may include cameras, lasers, sonar, radar detection units (e.g., ones used for adaptive cruise control), magnetic sensors, infrared (IR) light transceivers, IR distance sensors, ultrasonic transmitters/detectors, and/or the like, and/or a combination thereof. In some examples, external sensors may provide data updated in real-time, updating output to reflect current environment conditions. Object detection and classification for autonomous vehicles may be performed according to aspects disclosed in U.S. Pat. No. 8,195,394, which is incorporated by reference in its entirety.

In some aspects, using data from external sensors, the cameras may be able to classify objects, identify pedestrians and cyclists, motor vehicles, overstaying vehicles, badly parked vehicles, blacklisted vehicles, license plates, parking lines, parking markers, parking signs, curbs, trees, roads, terrain, obstacles, side strips, bridge abutments, and road margins, traffic signs, and signals. In some aspects, using data from external sensors, listing locations may be identified. Using machine learning algorithms, a neural network may be trained to identify listing locations. Machine learning algorithms are explained in further detail in the discussion of FIG. 4.

In some aspects, data may also be collected from other sources, including one or more application servers 230. In some examples, traffic data may be received by one or more application servers 230.

In some aspects, map database 240 map data used to generate a path, or may integrate one or more APIs. Integrated API may include a geolocation, mapping, and a navigation application such as GOOGLE MAPS, APPLE MAPS, WAZE, and/or the like and/or combinations thereof. In some examples, application servers 230 may interact with a map or a geographic information system (GIS) database, such as map database 240, through a map API such as the GOOGLE MAPS API. In some examples, the application servers query the map or GIS database for traffic data in response to receiving the sensor data from the wireless device 210 and/or host device. In some examples, map database 240 may be an SQL database. The application servers 230 may interface with one or more servers managing the SQL database. Application data and application states may be stored in a cloud managed SQL database. In some examples, map database 240 may be a document-oriented database including a NoSQL database such as a MONGODB database.

Figure 3:
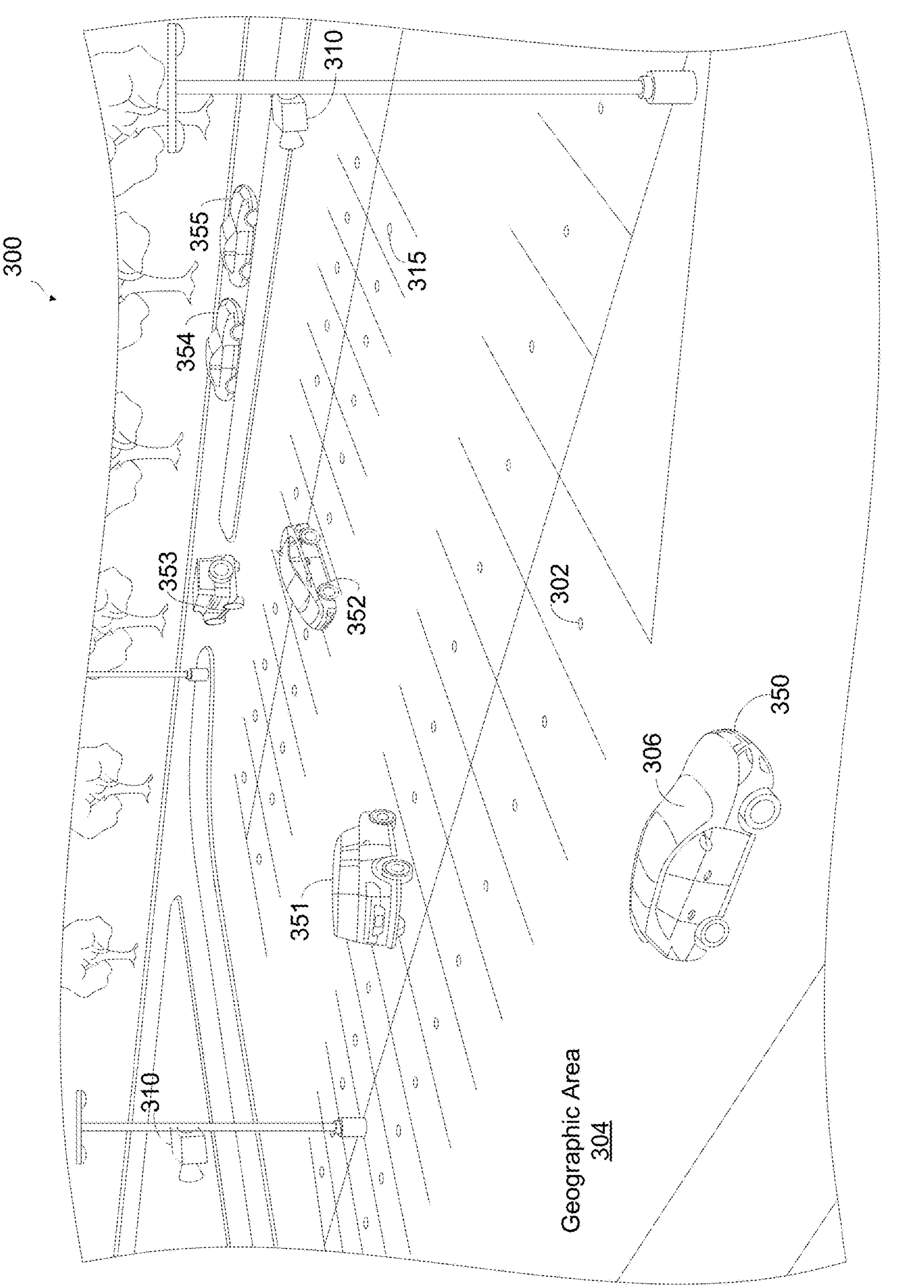
FIG. 3 illustrates an example system of cameras overlooking a parking lot with vehicles and open parking spaces, according to some examples of the present disclosure.

FIG. 3 illustrates an example system 300 of cameras 310 overlooking a parking lot with vehicles and open parking spaces, according to some examples of the present disclosure. In some aspects, geographic area 304 may include a lot, garage, space, and/or any other kind of property, such as one or more listing locations. In some aspects, a camera 310 is stationary or able to move in one or more directions. In some examples, camera 310 is able to capture still images and/or video. In some examples, camera 310 has a fisheye lens. In some examples, camera 310 is a plenoptic camera. In some aspects, camera 310 may be in communication with devices including parking sensors, vehicle devices, wireless devices, and/or the like and/or combinations thereof. In some examples, camera 310 is an 8-megapixel raspberry pi camera. In some examples, one or more vehicles 350-355 may correspond with vehicle 250. In some examples, camera 310 may correspond to one or more of computing devices 110, 140, 170. In some examples, wireless device 306 may correspond to one or more of computing devices 110, 140, 170, wireless device 210, and/or vehicle device 220. In some examples, wireless communication device 302 may correspond to one or more of computing devices 110, 140, 170.

In some aspects, virtual boundaries may include a geographic area 304. In some examples, when a wireless device enters and/or departs one or more virtual boundaries, it triggers the wireless device to receive a search request prompt for a listing location.

In some aspects, camera 310 may be in communication with wireless communication devices such as wireless communication device 302, which may transmit signals that include an identifier within the geographic area 304. In some aspects, using a private blockchain, there may be one or more cameras 310 which may become nodes and share a distributed ledger of transactions (e.g., vehicle entries and exits) of geographic area 304.

In some aspects, the wireless communication device 302 is one of the one or more computing devices with the capability to analyze the received signal strength index of a BLE beacon or similar BLE hardware transmitters. Said computing devices may triangulate the position of a wireless communication device 302 by, including but not limited to, edge computing or cloud computing. In some examples, wireless communication device 302 is a broadcast device, such as a beacon or other type of hardware transmitter. In some examples, wireless communication device 302. In some examples, wireless communication device 302 is a parking sensor, such as sensors described above with respect to FIG. 2.

In some examples, the bounds of the geographic area 304 may be defined by the signal range associated with wireless communication device 302. In some examples, the signal range is defined by the area in which the strength of the signal exceeds a threshold, such as −40 dBm. In some examples, the identifier includes information about wireless communication device 302 and information that may be recognized by a first software application installed on wireless device 306. In some examples, the identifier may be changed periodically, such as every second; identifiers may be changed for enhanced security. In some examples, the first software application actively monitors signals and compares identifiers included in those signals with those stored in a database. In some examples, signals are encoded or modulated according to predetermined parameters. In some examples, the database may include a cloud managed SQL database, such as a MICROSOFT AZURE database. In some examples, the first software application enables wireless devices to detect wireless communication devices such as beacons in proximity. In some examples, the first software application provides a digital coupon, boarding pass, event ticket, voucher, store card, credit card, loyalty card, debit card, and/or the like and/or combinations thereof that may also be called a pass. In some examples, an amount of a discount may be based on location, such as a specific parking garage, and based on an amount of traveling to such location from a starting location, such as number of miles traveled. In some examples, a digital coupon, such as with an added discount, may be sent in response to a reservation being scheduled from the starting location.

In some aspects, camera 310 is part of a vehicle detection method and system. Camera 310 may be used to capture images and/or video of geographic area 304 and, based on the images and/or video it may list locations parameters that may be determined and updated. In some examples, camera 310 may capture areas including a specific parking space identifier 315 and such image/video may be used to determine whether a vehicle is parked in the parking space or not, what type of vehicle is parked in the parking space, a license plate number, parking space number, other objects or hazards in the parking space, whether vehicles are within designated parking spaces, and/or the like and/or combinations thereof. Camera 310 may be used in combination with other cameras or sensors to increase an accuracy of determined features such as the availability of the parking space. The processing functionality may include motion detection, background modeling, subtraction, occlusion detection, and/or the like and may be used to determine which frames and regions in one or more image frames occurred from a video.

In some examples, the determination of features within geographic area 304, such as parking space availability, and/or whether a search request prompt should be sent is performed using a machine learning (ML) model discussed below with respect to FIG. 4.

In some aspects, transmission of a search request may be delayed. In some examples, the search request is transmitted when wireless device 306 is able to access a network, when wireless device 306 detects that it is relatively stationary, such as when the speed of wireless device 306 is less than 5 miles per hour, when wireless device 306 detects that it is located at or near (e.g., <1 meter) one or more listing locations or another designated area, such as a temporary stopping location. In some examples, speed of wireless device 306 may be determined using an accelerometer, inertial unit, gyroscope, magnetometer, and/or the like and/or a combination thereof. In some examples, the inertial unit may be implemented as a multi-axis accelerometer including a three-axis accelerometer, a multi-axis gyroscope including a three-axis MEMS gyroscope, or a combination thereof. In some examples, an application running on wireless device 306 may determine whether or not a user of wireless device 306 is also an operator of vehicles 350-355. In some examples, a message may be prompted on wireless device 306 and user input may be used to indicate that the user is not an operator of one of vehicles 350-355. In some examples, a search request may be transmitted in response to a determination that one or more passengers have exited one of vehicles 350-355, based on data from one or more external sensors.

Some advantages of disclosed aspects include being able to monitor locations of vehicles and/or wireless devices and provide directions to a listing location, even when data networks may temporarily be unavailable or have limited connectivity. Some advantages may also include social sharing of parking locations, so that groups that arrive at a parking facility may be able to find parking spaces close to other group members. Some advantages of disclosed aspects may additionally include monitoring vehicles passenger occupancy status. For instance, when a wireless device user enters a parking facility, it may be determined that the wireless device has entered the parking facility in a vehicle. Based on monitoring speed, it may be determined that the vehicle in which the wireless device is present has stopped based on the location of the wireless device being within a parking space and/or based on detecting that the wireless device is stationary for a threshold period of time, e.g., 10-15 seconds. Once the wireless device user has exited the parking facility with the wireless device, it may be inferred that the vehicle is no longer occupied.

In some aspects, geographic area 304 includes a parking lot. In some examples, wireless device 306 enters geographic area 304 with vehicle 350. In some examples, a pass may be added to the first software application, such as APPLE WALLET. Once the pass is added, wireless device may be presented with an option to download a second software application, such as a parking application (e.g., PIED PARKER). In some examples, the second software application may already be installed on wireless device 306 and deliver a notification to the user prompting them to save a new pass to their device or open an existing one. In some examples, at the entrance to the parking lot there is a kiosk or other fixed device that uses a short-range wireless technology, such as NFC, BLUETOOTH low energy (BLE) and/or the like, which, when in proximity or direct contact with wireless device 306, causes wireless device 306 to prompt a pass to be added via the first software application. In some examples, the fixed device includes an NFC reader, RFID tag reader, a facial recognition device, retina scanner, a fingerprint reader, barcode scanner, and/or the like and/or combinations thereof. In some examples, at the entrance/exit to the parking lot there are sensors, such as cameras, that may identify a vehicle and associate the vehicle with a payment profile. The vehicle may be identified visually by license plate number, vehicle identification number (VIN), by an appearance of the vehicle (such as by using machine learning as discussed below with respect to FIG. 4), and/or by one or more identifiers (e.g., an identifier that includes the license plate number or VIN of the vehicle) broadcast by a device within the vehicle, such as the stereo system projecting a MAC address, RFID chip in a license plate, auditory features such as engine noise, or identification of a driver, passenger, or other vehicle occupant such as by using facial identification, and the like.

In some aspects, a vehicle may contain a number of persons (including zero), any number of which may or may not have the parking application installed on a wireless device. In some examples, such persons may carpool such a vehicle, and at least one of such persons may have the parking application installed on a wireless device. Such wireless device may be in proximity to such a fixed device, e.g., via BLE, at such a parking lot entrance or exit. In some examples, such a wireless device may receive a notification from such a fixed device. In some examples, such a wireless device may monitor such a fixed device and trigger a notification locally (e.g., within 100-1000 meters). In some examples, such notification is received by a multiple number of persons in such vehicle. In some examples, the notification may prompt the existing user to open the parking application; the parking application may open a screen with an image of such existing user's vehicle at requesting entry at such parking lot entrance. In some examples, a vehicle can be scanned to determine which wireless devices have the parking application installed and which ones do not, and transmit notifications within the parking application to those that do, and a prompt to download the parking application to those that do not. In some examples, a person driving such vehicle does not have the parking application installed on a wireless device; however, the vehicle they are driving is associated with an existing user of the parking application. In some examples, the vehicle is driving itself and it is associated with an existing user of the parking application. In some examples, such a person may be driving such a vehicle that is not associated with an existing user; however, the person is an existing user of the parking application.

In some aspects, when an identifier is recognized, a corresponding message is prompted on the wireless device 306. In some examples, the corresponding message is a notification, alert, update, text message, chime, and/or the like, on wireless device 306. In some examples, the corresponding message presents a pass when a second software application, such as a parking application (e.g., PIED PARKER), is not installed on wireless device 306. In some examples, the corresponding message is a notification from the second software application such as the parking application installed on wireless device 306. In some examples, the corresponding message includes a request to search for a listing location. In some examples, the corresponding message includes a link. In some examples, the link is a deep link, such as a uniform resource identifier (URI) that launches a resource within a second software application. A deep link enables wireless device 306 to launch a second software application to a relevant portion within the second application without having to separately launch the second software application and navigate to that relevant portion. In some examples, the deep link is a deferred (AKA persistent) deep link, such that it routes wireless device 306 to content even if the second software application is not installed when the link is activated; via the deferred deep link, wireless device 306 is redirected to an application store, such as GOOGLE PLAY or the APP STORE, to allow for download and/or installation of the linked-to application, and then, upon completion of the download and/or installation, launches the second software application and navigates to the relevant portion.

In some aspects, a second software application, such as PIED PARKER, may already be downloaded on wireless device 306. In some examples, when the second software application is already downloaded, the second software application may generate one or more search request parameters automatically, and a search request may be generated. In some examples, only one software application is required. In some examples, search request parameters are associated with listing locations, parameters including, but not limited to, preset information or data concerning listing locations previously requested by wireless device 306, a time of entering the search request, a proximity to the physical location of wireless device 306, an availability time, temporal duration of reservation period, time remaining for availability, a type of listing location, such as whether the listing location may accommodate motorcycles, trucks, compact vehicles, and/or the like; a price range for a listing location, dimensions associated with listing locations, whether or not the listing location has an overhead cover, whether or not the listing location is an electric vehicle (EV) charging station, whether or not the listing location provides gas-filling services, a user rating associated with the listing location, such as a one to five star rating, a unique identifier associated with a parking space or parking lot, and/or the like and/or a combination thereof. In some examples, the driver's preferences may be integrated with one or more calendar APIs, such that meetings or other events with a temporal duration tied to a location may be identified. In some examples, the search request may be sent once network data is available to the driver's wireless device, and the driver subsequently completes the reservation of the parking space before returning to the parking garage. In some examples, a confirmation identifier may be sent to the driver's wireless device as a receipt, which may be shown/scanned in order to enter or exit the garage. In some aspects, opening a message containing the confirmation identifier may be sufficient to allow a user to enter and/or exit, with or without a prompt. In some aspects, preferences may be set by users to enforce a confirmation from wireless device 306.

In some aspects, parking facilities may have an express lane for vehicles with software applications such as PIED PARKER already downloaded on a device. Such lanes enable a faster parking experience, limiting the need to stop such vehicles on the way to a parking space or area, which may be reserved for certain vehicles in advance. In some examples, with respect to discussions above regarding FIG. 3, a vehicle can be recognized via license plate, VIN or stickers, e.g., RFID chip, QR code, BLE tracker. In some examples, a sticker may include a QR code that is colored to look like a logo, such as the gray and orange logo of PIED PARKER. The QR code may identify a vehicle as corresponding to a particular user, or, in some cases, multiple drivers corresponding to one vehicle. In some examples, the presence of a particular user can be recognized by the presence of a wireless device in their possession. In some examples, the vehicle and the person driving are both recognized, and are associated in a database. In some examples, such a vehicle is recognized, however, unassociated with a particular user. The user driving such a vehicle may associate the vehicle with their PIED PARKER account upon arrival and authentication by an on-site, PIED PARKER software-enabled device, e.g., handheld POS, fixed kiosk or smartphone. In some examples, the vehicle is recognized and the user is recognized. In some examples, authentication is performed by parking attendants using such a device on-site. In some examples, an express lane may have sensory devices installed, including but not limited to; LED strips, or speakers. In some examples, LED strips may change color to signal that a vehicle should not be in the lane.

Some advantages of disclosed aspects include completing a transaction for reserving a listing location with little to no user input. In some examples, using a wireless device, a user may complete hands-free payment of parking fees or receive parking verification. The wireless device may receive a notification once it is close to a parking facility. The notification may include pricing and hours information, which may be provided in part based on image data, and give the wireless device user the option, for instance, to simply use voice commands to trigger the parking space search request on the wireless device. Using pre-entered payment information, and information about a location, the wireless device may complete the transaction by confirming with the wireless device user whether or not to park at a location. This is a significant improvement over previous systems, which required frequent manual input. Some advantages of disclosed aspects also include reduced traffic, reduced processing time, and increased user acquisition, potentially from offering promotional rates for downloading a parking application and booking a parking space through a parking application.

In some aspects, geofencing may be used to determine when wireless device 306 enters or leaves geographic area 304 by means of a predetermined virtual geographic boundary that includes geographic area 304. In some examples, geographic area 304 may be a home, office location, one or more commercial parking facilities, an area surrounding one or more parking facilities; and/or the like. In some examples, geographic area 304 is non-circular, and may be rectangular, oval, square, triangular, trapezoidal, a polygon, and/or the like and/or any other shape. In some examples, a message may be sent in response to determining wireless device 306 has entered or left geographic area 304 based on location data associated with wireless device 306.

In some examples, the virtual boundary may be dynamically adjusted based on machine learning using data associated with a mesh network, data including listing location data, such as GPS coordinates, image and/or video data, wireless device location data, wireless device location data and time, and telemetric data between wireless device 306 and one or more beacons. The mesh network may give the virtual boundary in the form of a three-dimensional coordinate system.

In some aspects, the virtual boundary data is enhanced with navigational mappings, such as the location of the entrance and exit on the boundary, the location of the parking spaces in relation to the boundary, the indoor routing within the geographic area, such as the indicated direction vehicles are meant to travel or detours, and/or the like.

In some aspects, wireless communication device 302 is a plurality of one or more devices, and the plurality of one or more devices and/or wireless device 306 are part of a mesh network. In some examples, wireless device 306 connects to one or more nodes of the mesh network, including one or more devices associated with geographic area 304. In some examples, the plurality of one or more devices may include, but are not limited to, a Wi-Fi modem, GPS, RFID, a BLUETOOTH component, which may include, smart devices, a vehicle or vehicle device, such as vehicle device 220; and/or the like; a hotspot tether, a 3G or 4G modem, an LTE modem, a parking sensor, such as object detection sensors discussed above with respect to FIG. 2, and/or the like and/or combinations thereof.

Some advantages of disclosed aspects include the ability of camera 310, either alone or in conjunction with other devices, to determine parking space features such as availability. This is a significant improvement over previous systems that were unable to determine such parking space features with the existing infrastructure. For instance, camera 310 overlooks a lot within geographic area 304. In some aspects, a vehicle 350 with wireless device 306 is searching for a listing location near geographic area 304. It may be determined that wireless device 306 and/or vehicle 350 is searching for a parking space based on vehicle movements, calendar events, traffic, or proximity, including factors as described in U.S. Pat. No. 10,176,717, which is incorporated by reference in its entirety. In some examples, parking space availability may be determined by using data from one or more sources, such as parking sensors in the lot such as wireless communication device 302, camera 310, and cameras on vehicles that have entered geographic area 304, such as vehicles 350-355. It may be determined, using the various data sources, that there is a listing location within geographic area 304 that is available, such as the listing location designated by parking space identifier 315.

Some advantages of disclosed aspects include detecting if a reserved space is occupied before vehicle arrival. Using the various data sources, it may be determined that a listing location such as parking space identifier 315 is occupied by another vehicle. This is a significant improvement over systems that often required expensive or inaccurate sensors for each parking space or manual monitoring of inventory (e.g., clickers). Another request for a listing location may be initiated and a new listing location may be selected based on the same or similar parameters.

Some advantages of disclosed aspects include the increased accuracy of verifying when a wireless device has entered or departed a geographic area, and in some examples this verification may require limited use to no use of GPS or outside data networks (e.g., networks other than the mesh network). More specifically, in some parking garages, access to data networks may be limited because parking garages are often underground or are surrounded by thick walls of concrete. In some examples, the physical presence of wireless device 306 may be verified without the use of GPS or data networks.

Figure 4:
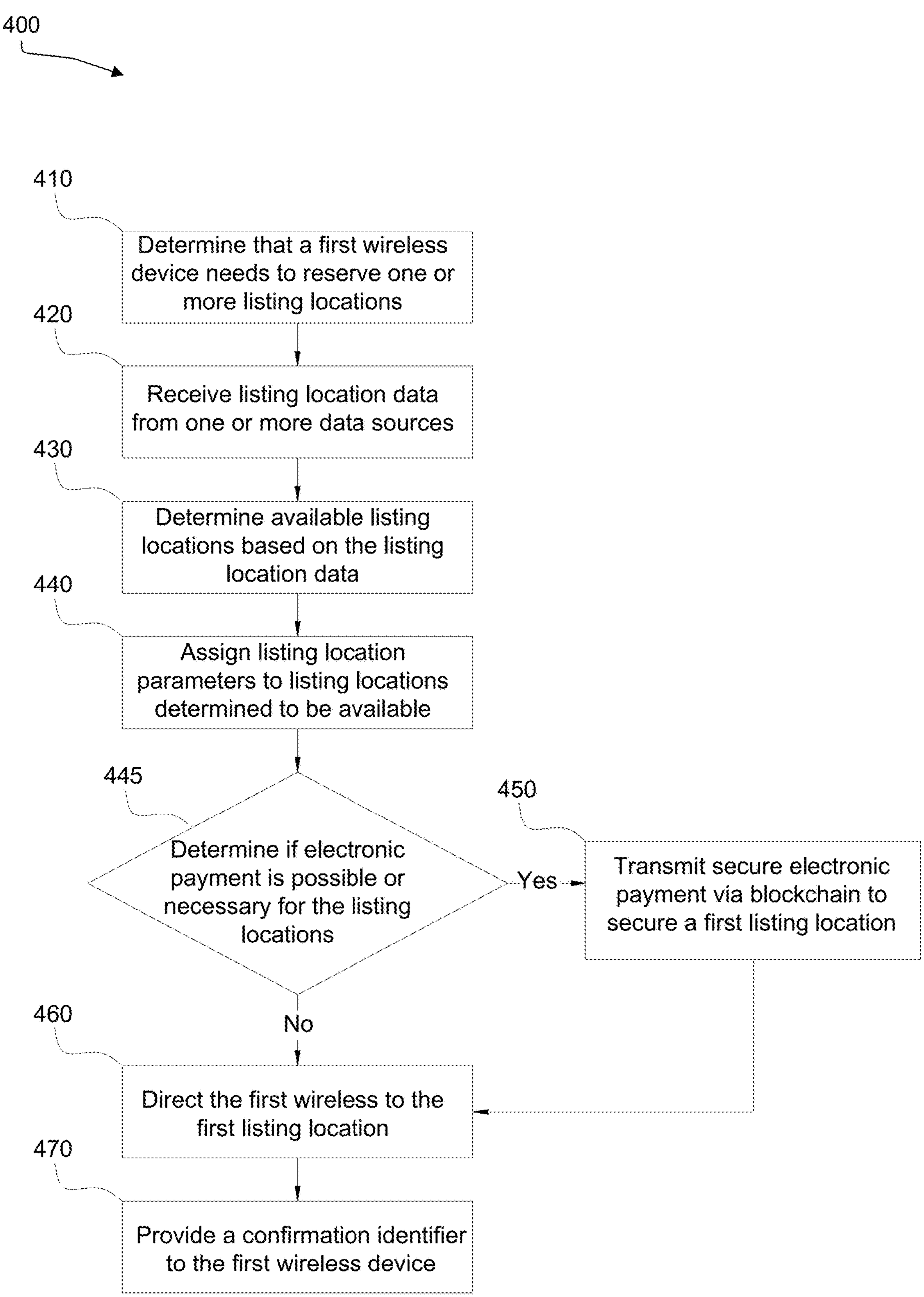
FIG. 4 illustrates an example process for parking identification and payment processing using blockchain technology, according to some examples of the present disclosure.

FIG. 4 illustrates an example process 400 for parking identification and payment processing using blockchain technology, according to some examples of the present disclosure. The process (also method) 400 is illustrated in FIG. 4 as a set of processes 410-450. In some examples, processes 410-450 may be implemented on one or more application servers, such as application servers 230. In some examples, not all of the illustrated processes may be performed in all aspects of method 400. Additionally, one or more processes not expressly illustrated in FIG. 4 may be included before, after, in between, or as part of processes 410-450. In some aspects, one or more processes 410-450 may be implemented, at least in part, in the form of executable code stored on non-transitory, tangible, computer readable media that, when run by one or more processors (e.g., a processor of the wireless device), may cause the one or more processors to perform one or more of processes 410-450. In some examples, the first wireless device may correspond to one or more of computing devices 110, 140, 170, wireless device 210, and/or vehicle device 220, one or more sensors may include those sensors discussed above with respect to FIG. 2, and wireless communication device 306. In some examples, the geographic area corresponds to geographic area 304. In some aspects, method 400 may be performed for a vehicle parking on a street, such as the street including vehicles 354 and 355.

In some cases, during process 410, it may be determined that a first wireless device needs to reserve one or more listing locations. In some examples, the determination may be performed by one or more application servers monitoring location data and sensor data associated with the wireless device and/or using geofencing, as discussed above with respect to FIG. 3. In some examples, the determination may be performed by the first wireless device, using methods above with respect to FIG. 3. In some examples, the determination is determined because of receiving a search request including listing location parameters. In some examples, a search request is generated, and one or more parameters are included with little or no user input. In some examples, parameters include search request parameters associated with listing locations, parameters including, but not limited to, preset information or data concerning listing locations previously requested by the first wireless device, a time of entering the search request, a proximity to the physical location of the first wireless device, an availability time, temporal duration of reservation period, a type of listing location, a price range for a listing location, dimensions associated with listing locations, whether or not the listing location has an overhead cover, whether or not the listing location is an electric vehicle (EV) charging station, whether or not the listing location provides gas-filling services, a user rating associated with the listing location, such as a one to five star rating, an identifier associated with a parking space or parking facility, and/or the like and/or a combination thereof.

In some cases, during process 420, listing location data may be received from one or more data sources. In some examples, the data sources may include external vehicle sensors on a first vehicle, such as vehicle 250 and vehicles 350-355, crowdsourced data from other external vehicle sensors or manual reports of availability from wireless devices, sensor data from sensors installed in the ground or installed on a vantage point, data from drones or other aerial machines, ground-based machines, traffic data, parking application data, and data from wireless devices, and/or the like and/or combinations thereof. Listing location data may also be inferred by the assignment of particular parking locations to specific numbered locations, such as parking space identifier 315. In some examples, ground-based machines may include autonomous vehicles or machines such as a KNIGHTSCOPE security robot. In some examples, the vantage point may be a part of a building or a lamp post. In some examples, parking application data may come from several parking applications.

In some cases, during process 430, available listing locations may be determined based on the listing location data. In some examples, the determination is performed by local hardware or it is captured by local hardware and then performed in the cloud, or a combination thereof. Listing location data may include information about available listing locations currently unoccupied by vehicles, or data from which it may be determined from multiple data sources. The data sources may include image data sources, such as images sent from cameras on one or more vehicles, cameras placed in a vantage point, and/or the like. In some examples, external vehicle sensor data from multiple vehicles may be used to identify unoccupied listing locations in real time.

In some aspects, sensor data may be used to determine occupied versus unoccupied listing locations. In some examples, a machine learning (ML) model may be trained/tuned based on training data collected from positive recognition, false recognition, and/or other criteria. In some aspects, the ML model may be a deep neural network, Bayesian network, and/or the like and/or combinations thereof. Although various types of ML models may be deployed to refine some aspects for identifying whether a listing location is occupied or not, in some aspects, one or more ML-based classification algorithms may be used. Such classifiers may include but are not limited to: MobileNet object detector, a Multinomial Naive Bayes classifier, a Bernoulli Naive Bayes classifier, a Perceptron classifier, a Stochastic Gradient Descent (SGD) Classifier, and/or a Passive Aggressive Classifier, and/or the like. Additionally, the ML models may be configured to perform various types of regression, for example, using one or more various regression algorithms, including but not limited to: Stochastic Gradient Descent Regression, and/or Passive Aggressive Regression, etc.

In some examples, a virtual boundary including geographic area 304 may be dynamically adjusted using systems and methods described in U.S. Pat. No. 9,349,104, which is incorporated by reference in its entirety.

In some aspects, the training engine of the ML model may include a scenario module, including an arrangement of vehicles parked in various listing locations. Such scenarios may manually or receive human inputs specifying features including parked vehicles, parking lot lines, and other features within listing locations. In some examples, a neural network may be trained for a given ML model using backpropagation.

In some aspects, an ML model neural network includes neural network modules that comprise feed-forward computation graphs with input nodes, hidden layers, and output nodes. In some examples, for classifications that involve images, pixel-values of an input image forming part of a classification may be assigned to input nodes. Such input nodes may be fed through the network and pass a number of non-linear transformations. In some examples, once the input nodes are fed forward, the output node may yield a value that corresponds to the class inferred by the neural network.

In some aspects, once an ML model is trained, the ML model may receive one or more inputs, e.g., one or more images captured by external sensors or cropped portions of one or more images captured by one or more sensors and classify those inputs as having a particular numeric affinity for each class for which the network was trained. In some examples, a ML model may be specific to a particular listing location or group of listing locations, such as a parking lot. In some examples, the ML model may be specific to a parking lot at specific times, such as a busy grocery lot during the weekend. In some examples, a ML model may be trained to identify certain features of vehicles, such as, identify certain aspects of the vehicle such as the make, model, year, color, shape, and if any, customizations, damage and plates. Some advantages of disclosed embodiments include identification of vehicles even when a license plate cannot be recognized.

In some aspects, a vehicle may enter a parking lot such as the parking lot discussed above with respect to FIG. 3. Such a vehicle may be recorded by one or more cameras and/or microphones, from multiple angles and at multiple points in time; capturing numerous features of the vehicle prior to entering, including both visual and auditory characteristics. A subset of the numerous features, such as the make, model, and year, may be used to construct a partial Vehicle Identification Number (VIN). When a vehicle enters the lot, the partial VIN and other features, such as plates, decals, damage, engine-noise, and vehicle customizations, such as spoilers, after-market additions, and the like may be collected then persisted to a database that is, for example, located on-premise. Recordings of the vehicle once entered may be collected and persisted, then distinctly mapped to a vehicle persisted in the database, and to the associated user thereof, e.g., based on a scoring system that shows the likelihood that a vehicle shares the same features of a particular vehicle that has been recorded entering the lot. In some aspects, the partial identification of a vehicle may be combined with the identification of a user associated with the vehicle, e.g. BLE, NFC or RFID may be used to detect the proximity of a user inside their vehicle.

In some aspects, an ML model may be trained on visual and auditory data, e.g., historic footage recorded by vehicle 'dash cams' from which the video and audio is processed with historic parking data, traffic data, sounds of a vehicle with its engine running coupled with the visual aspects of the vehicle.

In some aspects, an ML model may be trained to identify particular listing locations and features of the listing locations or objects of interest, such as parking lines, arrows, numbers, meters and associated information (e.g., meter number), parking signs, parking floors, coloring, characters, parking restriction indicators (e.g., no-parking signs, signs limiting parking hours, fire hydrants, handicap parking signs, etc.), curbs, side strips, objects such as pedestrians and cyclists, various types of vehicles, trees, roads, terrain, motor vehicles, overstaying vehicles, badly parked vehicles, blacklisted vehicles, abandoned vehicles, license plates, bridge abutments, construction zones, cones, road margins, traffic signs, license plates, street signals and/or the like. In some examples, one or more pre-trained models may be incorporated and made a part of an ensemble of models.

In some aspects, an ML model may be trained in a virtual environment. In some examples, training in a virtual environment can enhance a model's focus through reinforcement learning, on certain visual data or scenarios, which may occur infrequently. This enables the ML model to account for edge cases (that may be based on real scenarios) that an ML model with less training may perform inaccurately when encountering the same or a similar scenario to such edge cases. In some examples, a virtual environment may be a 3D model of an environment within which batches of random simulations are performed. In some examples, the training may be performed by one or many persons via augmented reality.

In some examples, an ML model ensemble of neural networks may apply one or more threshold comparisons or tests to determine whether any particular classification is sufficiently dispositive so as to be acted or relied upon (e.g., whether the classification is sufficiently dispositive such that occupancy may be determined). In some examples, a neural network module may test a classification to see if the separation between a top score and all other scores meets or satisfies a certain separation threshold. A neural network may be trained to recognize (e.g., produce affinity scores for) a certain, predetermined set of classes. The number of classes within such a set may vary between ensembles.

In some aspects, the number of classes may be one greater than the types of parking lot configurations a corresponding vehicle is likely to encounter. In some examples, if a neural network were only concerned with arrows and a corresponding vehicle were only likely to encounter four types of arrows, the number of classes may be five and include a not-an-arrow class, a left-to-right-arrow class, a right-to-left-arrow class, a front-to-back-arrow class, and a back-to-front-arrow class. In some examples, a neural network may be trained to recognize more than just arrows or parking configurations (e.g., locations and/or orientations of parked vehicles, locations, orientations of lines, and/or the like and/or combinations thereof) other than arrows. In some examples, a neural network may be trained to recognize one-way lanes of various configurations including feeder lanes that extend from a thoroughfare to various directions of travel and angles 0 to 360 degrees.

In some aspects, method 400 may include gathering probabilistic info using the image data and other data, e.g., traffic data and historical data to listing locations being available. In some examples, listing locations are selected for one or more vehicles searching for parking such that traffic is reduced and a time to parking for each vehicle is reduced or minimized. In some examples, notifications may be sent to parking providers based on availability of parking locations within an area being low, e.g., parking availability being below 10 percent to current capacity. In some examples, a pricing model may be used to calculate a recommended cost for a listing location, based on surrounding location data and historical information of payments. In some aspects, video storage may filter for relevant portions of video based on one or more detected objects of interest.

Some advantages of disclosed aspects include greater accuracy by being able to detect occupied and unoccupied parking spaces. This allows for more efficient use of a parking lot's resources and for increase in revenue. Vehicle operators and vehicles will have to spend less time looking for parking because availability of parking spaces is updated in real time. Prediction algorithms may also be improved, with more data about real-time availability, prediction systems are able to detect more subtle variances that self-reporting would otherwise not account for.

In some cases, during process 440, listing locations determined to be available during process 430 may be assigned listing location parameters. In some examples, listing location parameters include whether the listing location is free or the price for parking a vehicle, whether the location is associated with a particular parking space and the parking space has an assigned value within a database. In some examples, it may be determined whether a listing location is associated with a meter and the meter has an assigned value within a database. In some examples, in process 440 it is determined whether listing locations are associated with a particular parking facility or organization or are managed by a particular organization or application.

In some cases, during process 445, it is determined whether electronic payment is possible or necessary for the listing location. In some examples, when it is determined electronic payment is not possible or is unnecessary for the listing location (e.g., parking is free), then the method proceeds to process 460. In some examples, determination may be derived from existing parking location data and through real-time recognition of parking information signs and other image data. In some examples, a metered listing location may belong to a city and it may be determined whether online or telephonic payment for the metered listing location is possible. If no payment is possible, an alert may be generated that the location requires manual payment or other verification. If a listing location belongs to a private facility, payment online or telephonically may be possible. In some examples, payment may be through a link or QR code posted on a parking sign. In some examples, other APIs may be integrated to facilitate payment, e.g., with PIED PARKER and payment for a particular meter in a city. Availability may also be cross referenced with any restrictions that may be more permanent (e.g., posted signs regarding weekly street sweeping) and restrictions that may be more temporary (e.g., construction signs that block out parking for periods of time, such as during certain hours or dates, and/or signs that block out parking for events). Basically if any of the desired reservation time occurs during a restricted time, then either the reservation may be canceled or cut short, depending on preferences.

In some cases, during process 450, electronic payment is transmitted for the securing of a first listing location. Electronic payment may be completed using stored payment information. In some examples, payment may be made through an API and use identifying information such as a telephone number. In some examples, a text message containing a vehicle's identification information, for example, a Vehicle Identification Number (VIN) or License Plate Number (LPN), is sent to a mobile number that identifies a parking space or collection thereof. In some examples, an AI system may be used to respond to such telephonic requests with vehicle information, payment method settings, parking profile preferences and parking space ID numbers. In some examples, electronic payment may include manual input of payment information via a first software application. In some examples, a telephone call may be initiated and may be programmed to respond to the requests for information, such as telephone number and credit card information, using numeric telephone inputs or using a computerized voice. The telephone call may respond to automated telephone systems or to converse with a parking provider on the phone, such as using GOOGLE ASSISTANT. In some instances, information, including vehicle information, payment information, and other types of information discussed in this application may be transmitted securely using a blockchain where the information may be protected from surveillance or receipt by an outside party or person.

In some aspects, transmission of payment information for electronic payment may be delayed. In some examples, payment may be transmitted once a wireless device has access to a network, in a designated area, or may be rerouted by other devices, such as wireless communication device 302. In some examples, attempts to transmit may occur periodically or once network is detected again. In some examples, payment for the maximum duration allowed is initiated and then when the network is detected again, it could cancel and prorate that amount to only pay for the time actually parked. In some examples, the system could track when the operator parks his vehicle and then make a payment when data connectivity is restored and stop when a user is back in their vehicle and transmitting data.

In some cases, during process 460, directions to the first listing location are provided to the first wireless device. Parking of a vehicle may be performed autonomously or semi-autonomously as discussed above with respect to FIG. 2. In some examples, the listing location may not be marked by physical lines, but may be completely determined by virtual boundaries. In some aspects, parking arrangements for a plurality of vehicles may be predetermined or dynamic. An arrangement may include a smart arrangement so as to increase the number of cars able to park within a parking lot.

In some cases, during process 470, a confirmation identifier may be transmitted to the first wireless device. In some examples, the confirmation identifier is transmitted from one or more application servers. In some examples, a confirmation identifier includes a coded image, such as a barcode, a pass key, a password comprised of alphanumeric characters, an encrypted signal or key, and/or the like and/or a combination thereof. In some examples, the confirmation identifier prompts the first wireless device to transmit a signal, such as methods discussed above with respect to FIG. 3. In some examples, the confirmation identifier may be manually displayed to a toll booth operator. In some examples, a toll booth operator may use a scanner to scan a coded image displayed on the first wireless device including the confirmation identifier. The confirmation identifier may be transmitted by the wireless device, the confirmation identifier causing a secured area to become unlocked. In some examples, the secured area may be a locked box or locker, such as an AMAZON LOCKER, an access control mechanism, a lock to a vehicle or non-motor-powered means of transportation, and/or the like and/or a combination thereof. In some examples, an access control mechanism may be a gate, a gate arm, and/or the like; at the entrances and exits of a parking facility. In some aspects, the aforementioned secure areas are or have mechanisms that can be securely operated without additional hardware. In some aspects, to control access, the mechanisms are bypassed with a relay module and/or alike. In some examples, the relay module is capable of a wireless connection, and/or additional hardware enables the wireless connections required.

In some aspects, the confirmation identifier may unlock a secured area for storing the vehicle unlocking mechanism, such as a valet key box. In some examples, the valet will have access to the keys to be able to move the vehicle if necessary. In some examples, one or more of vehicle, access control mechanism, and/or lockers include an NFC reader, RFID tag reader, a facial recognition device, retina scanner, a fingerprint reader, barcode scanner, and/or the like and/or combinations thereof.

Some advantages of disclosed aspects include real time identification of listing location availability and automatic booking, increasing efficiency and use of parking lots, minimizing accidents, reducing park and drive time, reducing traffic, less accidents, simplification of user experience, increasing revenue, reducing carbon emissions, and faster processing of transactions. In some examples, a wireless device user requests a parking space for a vehicle. The wireless device user may include preferences in the request for parking spaces suitable for the user's preferences and the vehicle. Available parking spaces may be determined using multiple sources, such as overhead camera images, parking sensors, and visual data from other vehicles close to the area the wireless device user wishes to park. Once available parking spaces are determined, these parking spaces may be associated with a particular parking vendor or application, such as PARK MOBILE. Using the information about the parking spaces, it may be determined whether payment for one or more parking spaces is necessary, i.e., it is free, or, if it is necessary, if payment is possible, such as whether a meter will take payment over the phone or whether a particular parking vendor will take electronic payment. It may be determined whether parking is free by cross referencing available parking spaces with information about the parking spaces in a database. If electronic payment is possible and necessary, payment may be done over the phone or using an integrated app. This is a significant improvement over previous systems, because facilitating electronic payment for a parking space allows for the operator to avoid having to complete the transaction while at the parking facility gate or while driving and looking for a parking space; the operation may simply be completed using a wireless device application or other wireless device. By way of another example, a vehicle may have a known destination inputted in a navigation software application, a calendar entry, other passes stored in the wallet, based on location history, entering a geofenced area, etc. In some examples, when looking for a listing location based on information included in a calendar entry or a particular destination, and not in proximity to destination, databases may be used to gather information on availability, proximity, cost, and/or the like. In some examples, a calendar entry may correspond with a flight departure, and a search request for a parking facility in proximity with the corresponding airport may be processed in accordance with disclosed methods. In some examples, a search request may be processed as described in U.S. Pat. No. 10,176,717, which is incorporated by reference in its entirety. This is a significant improvement over previous systems that may have required manual input of all or nearly all relevant information in order to complete a parking transaction for a particular location.

Figure 5:
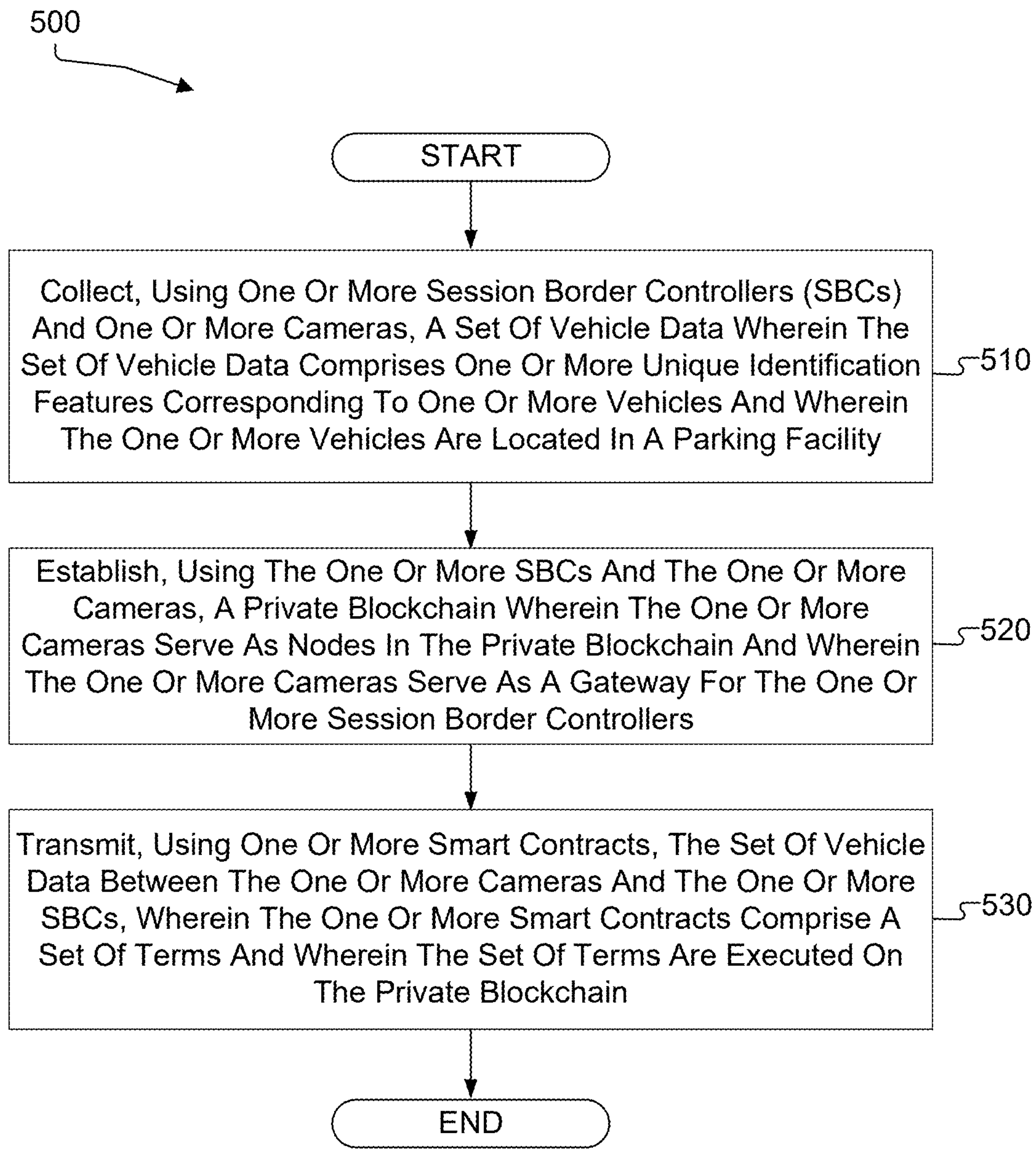
FIG. 5 illustrates an example process for securely transmitting vehicle data via a private blockchain using smart contracts, according to some examples of the present disclosure.

FIG. 5 illustrates an example process 500 for securely transmitting vehicle data via a private blockchain using smart contracts, according to some examples of the present disclosure. At block 510, the process 500 includes collecting, using one or more session border controllers (SBCs) and one or more cameras, a set of vehicle data wherein the set of vehicle data comprises one or more unique identification features corresponding to one or more vehicles and wherein the one or more vehicles are located in a parking facility. For example, one or more vehicles (e.g., vehicles 351, 352, 353, 354, 355 as illustrated in FIG. 3) may be located in a parking facility (e.g., parking lot as illustrated by geographic area 304 in FIG. 3 or a parking structure such as a building as illustrated by geographic area 602 of FIG. 6). In some aspects, the parking facility may include one or more SBCs and one or more cameras (e.g., as illustrated in FIG. 7) that may identify unique features of the vehicles including, but not limited to, license plate, vehicle color, vehicle shape, vehicle size, VIN number, objects within the vehicle, passengers in the vehicle, bumper stickers located on the vehicle, and other unique identifying features of the vehicle.

At block 520, the process 500 includes establishing, using the one or more SBCs and the one or more cameras, a private blockchain wherein the one or more cameras serve as nodes in the private blockchain and wherein the one or more cameras serve as a gateway for the one or more session border controllers. For example, the one or more SBCs and one or more cameras may be able to share a ledger of transactions on the private blockchain for a set of vehicle data such as vehicle exits and entries within the parking facility in addition to the unique identifying features of the vehicles located in the parking facility. The one or more cameras may record (e.g., using video or still images) data pertaining to the one or more vehicles in the parking facility.

At block 530, the process 500 includes transmitting, using one or more smart contracts, the set of vehicle data between the one or more cameras and the one or more SBCs, wherein the one or more smart contracts comprise a set of terms and wherein the set of terms are executed on the private blockchain. For example, a smart contract may provide a mechanism to securely transmit image and video data from one camera and associated SBC to another camera and associated SBC. In other words, the private blockchain may enable to secure transmission of unique vehicle identifying features between each SBC and corresponding camera within the parking facility.

Figure 6:
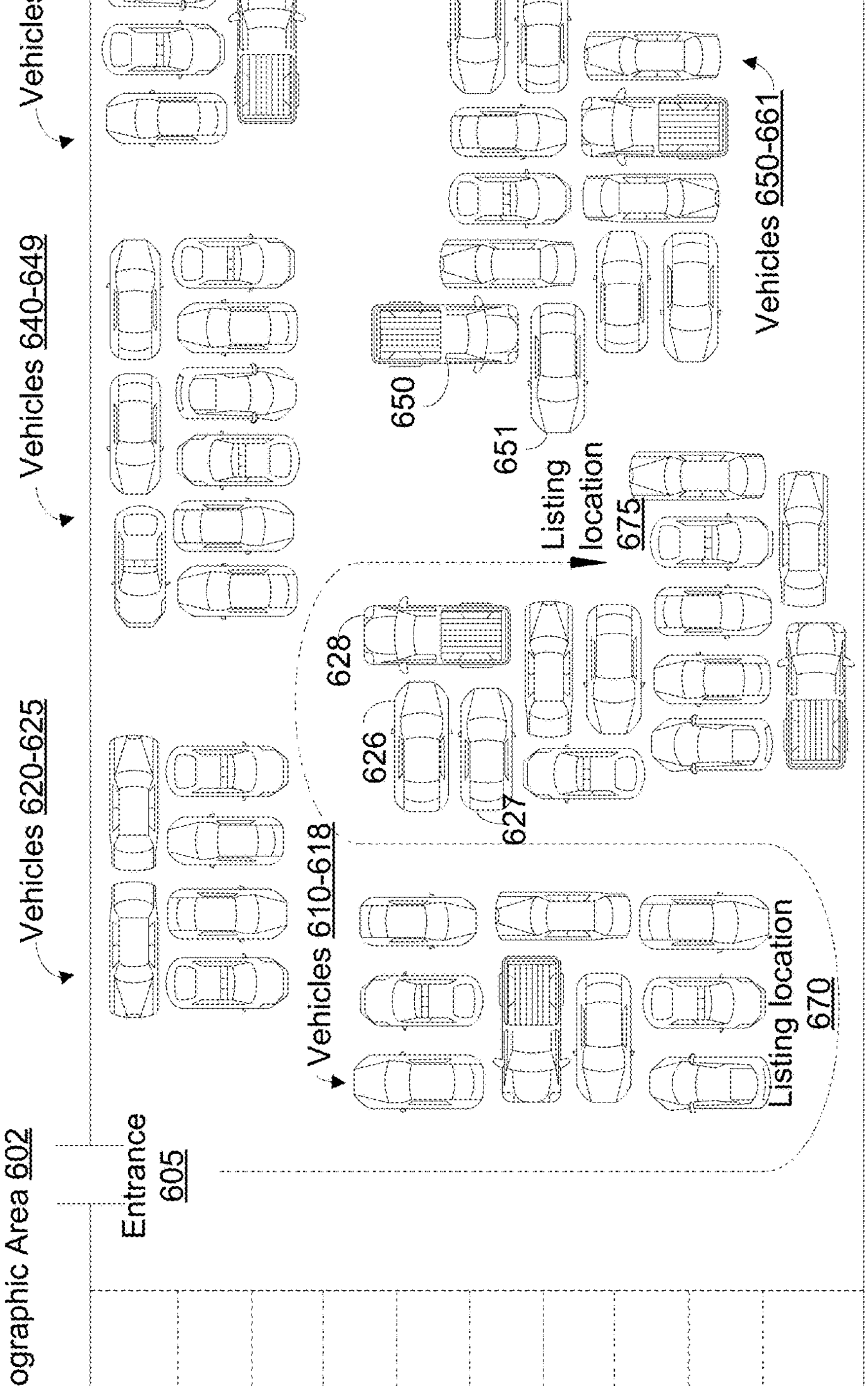
FIG. 6 illustrates an example system for parking within a geographic area including dynamically assigned listing locations, according to some aspects of the present disclosure.
Figure 7:
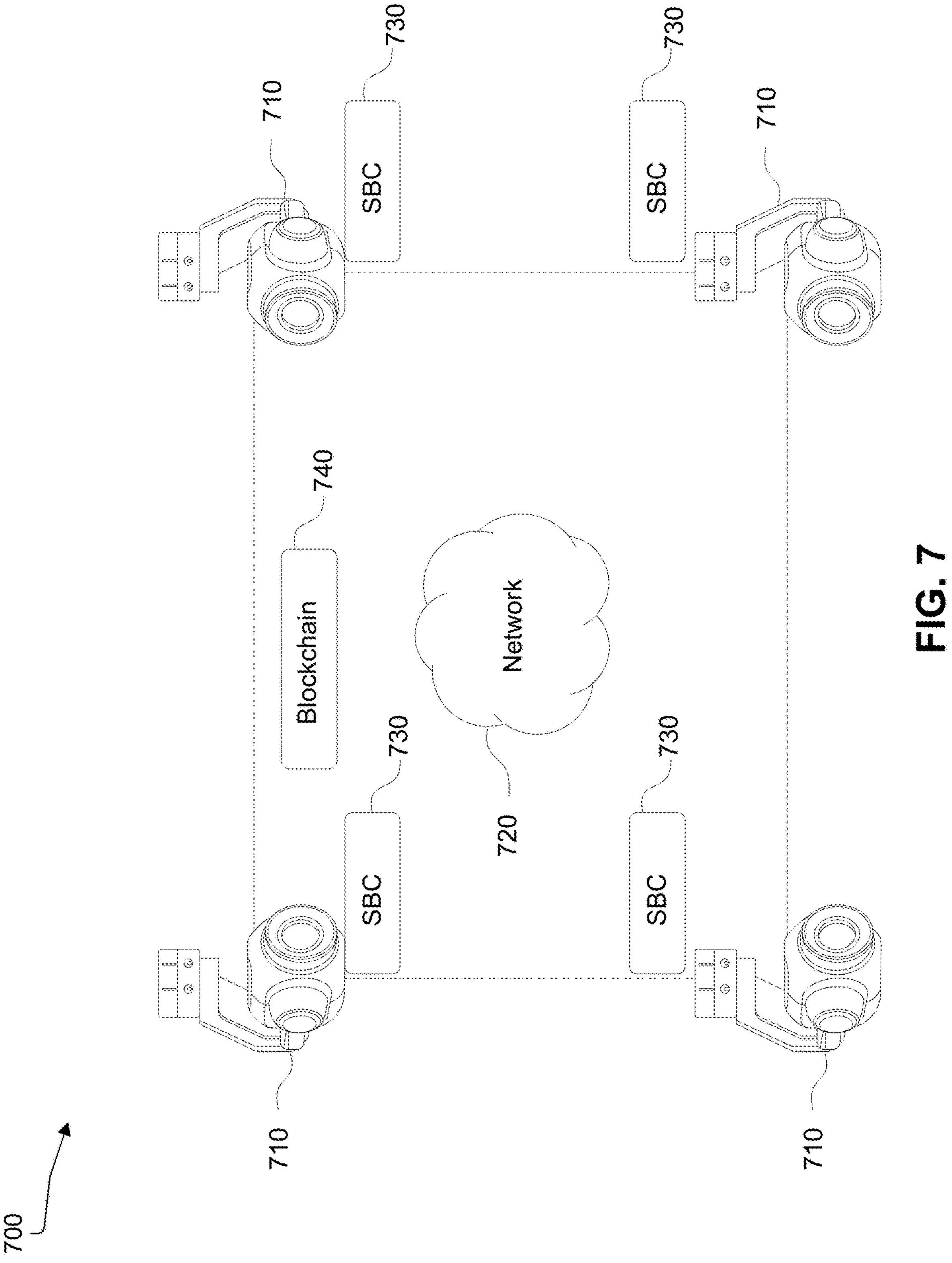
FIG. 7 illustrates an example system of cameras connected to a network securely communicating using blockchain technology, according to some examples of the present disclosure.

FIG. 6 illustrates an example system 600 for parking within a geographic area including dynamically assigned listing locations, according to some aspects of the present disclosure. FIG. 6 shows the floor plan of a parking structure showing vehicles 610-618, 620-625, 626-638, 640-649, 650-661, and 662-665 parked within geographic area 602. In some examples, listing locations may correspond with listing locations discussed above with respect to FIGS. 3-5. In some examples, geographic area 602 may correspond with geographic area 304. In some examples, parking spaces may be vehicular carousels and may be accessed using lifts. In some aspects, a vehicle travels along the path from entrance 605 to listing location 675 through listing location 670. In some examples, the vehicle includes at least one wireless device, that may correspond to one or more of computing devices 110, 140, 170, wireless device 210, vehicle device 220, or wireless device 306. In some examples, the vehicle corresponds with vehicle 250 or vehicle 350. In some examples, the wireless device may enter geographic area 602.

In some aspects, using a mesh network, such as the mesh network discussed above with respect to FIG. 3, location data associated with the wireless device and/or the vehicle entering geographic area 600 may be monitored. In some examples, location of the wireless device may be derived using collective telemetric data of the beacons in the mesh network, including telemetric data between the wireless device and one or more beacons and location data of the one or more beacons. In some examples, the wireless device may receive and analyze high frequency, low-power electromagnetic radiation from multiple locations to triangulate a relative 3-D position and orientation within geographic area 602. In some examples, the triangulation may be performed on one of the one or more wireless communication devices in proximity and communication with the wireless device. In some examples, trilateration may be used to devise the coordinates of the wireless device. In some examples, each of the beacon's coordinates may be determined using ultra-wide band (UWB), based on a time taken for each beacon to send a signal to another beacon. From this data, a map of beacons and their locations may be determined with respect to one another. In some embodiments, the one or more wireless communication devices may be securely communicating with each other using blockchain technology, which will be discussed in further detail below in FIG. 7.

FIG. 7 illustrates an example system 700 of cameras connected to a network securely communicating using blockchain technology, according to some examples of the present disclosure. In some embodiments, the one or more cameras 710 may be connected to a network 720 such as a cloud network. In the present disclosure, a cloud network is a type of IT infrastructure in which some or all of an organization's network capabilities and resources are hosted in a public or private cloud platform, managed in-house or by a service provider, and available on demand. In some embodiments, the network 720 may be a public network or a private network (i.e., not a cloud network). As discussed above with respect to FIG. 3, one or more cameras 710 may be able to capture still images and/or video. One or more cameras 710 may be in communication with devices including parking sensors, vehicle devices, wireless devices, and/or the like and/or combinations thereof. In some embodiments, one or more cameras 710 may correspond to one or more of computing devices 110, 140, 170 as illustrated in FIG. 1. As shown in FIG. 7, the one or more cameras 710 may be in communication with one another and may be able to receive and transmit data (e.g., between cameras 710).

In some embodiments, the one or more cameras 710 may have a dedicated Session Border Controller (SBC) 730 that may participate in the network 720. In some embodiments, the SBCs 730 may be able to communicate with the network 720 through a camera 710 acting as a gateway. In some embodiments, the one or more cameras 710 at a facility may be able to communicate with each other on a private network locally. In some embodiments, using a private blockchain 740, the cameras 710 at a parking facility may become nodes and share a distributed ledger of transactions (e.g., vehicle entries and exits). The one or more cameras 710, each with a dedicated SBC 730, may receive frames from another camera 710, and need them processed. For example, when frames capture a vehicle entering or exiting a facility, the event can be recorded as a transaction on the ledger amongst the nodes. The SBC 730 may be resource constrained and need to outsource the task over the network 720. In some embodiments, a smart contract could represent the request for this task and provide the mechanism to securely transmit the image from one node to another for processing. As a background on smart contracts, a smart contract, like any contract, establishes the terms of an agreement. Unlike a traditional contract, a smart contract's terms are executed as code running on a blockchain. Smart contracts allow developers to take advantage of blockchain security, reliability, and accessibility while offering sophisticated peer-to-peer functionality. A smart contract is self-executing code that carries out the terms of the agreement. This code is sent to an address on a blockchain as a transaction, where it is verified by that blockchain's consensus mechanism. Once this transaction is included in a block, the smart contract is initiated and irreversible. Some advantages of disclosed embodiments include secure communications between the one or more cameras 710 on the network 720.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A apparatus comprising:

at least one memory; and at least one processor coupled to the at least one memory, the at least one processor configured to:

collect, at entry and exit points of a parking facility using one or more session border controllers (SBCs) each coupled to a corresponding camera mounted within the parking facility, a set of vehicle data frames of one or more vehicles, wherein the data frames of the comprise information from which one or more unique identification features corresponding to the one or more vehicles are extractable;

extract, by a computer-vision model executing on one or more edge processors located within a threshold proximity to the parking facility, one or more unique vehicle-identification features from image and/or video frames;

identify a user status associated with a user account;

select, from the one or more parking locations, a parking location based on the user status;

assign, by the SBC associated with each camera, a session identifier to the extracted vehicle-identification features for an individual vehicle event, the session identifier uniquely identifying a vehicle entry or exit within the facility;

generate, for the session identifier, a blockchain transaction record including the extracted vehicle-identification features, a timestamp, and location data;

commit, using one or more smart contracts executed on a private blockchain in which the cameras operate as blockchain nodes and serve as gateways for the associated SBCs, the blockchain transaction record to a distributed ledger maintained by the nodes, wherein the smart contracts are triggered by the vehicle event identified by the session identifier and define encryption parameters, validation rules, and consensus conditions for the vehicle event;

transmit, in response to execution of the smart contracts, the committed blockchain transaction record over a facility network comprising at least one of: (i) a private local network connecting the cameras and SBCs within the parking facility, or (ii) a cloud-based or other external network, the transmission being secured and validated according to the parameters defined by the smart contracts;

receiving a confirmation identifier, the confirmation identifier being associated with the vehicle event; and transmit a signal that causes unlocking of a secured area in response to receipt of the confirmation identifier.

2. A system comprising:

at least one memory; and at least one processor coupled to the at least one memory, the at least one processor configured to:

detect motion of an object at a first location associated with a geographic area using a motion sensor, the geographic area including one or more parking locations;

responsive to detecting the motion of the object at the first location, capture, using one or more cameras, image data associated with the first location;

extract, by a computer-vision model executing on one or more edge processors located within a threshold proximity to the one or more parking locations, one or more vehicle-identification features from the image data;

assign a session identifier to the extracted vehicle-identification features for an individual vehicle event, the session identifier uniquely identifying a vehicle entry or exit within the facility;

identify a user status associated with a user account;

select, from the one or more parking locations, a parking location based on the user status;

generate, for the session identifier, a blockchain transaction record including the extracted one or more vehicle-identification features, a timestamp, and location data;

transmit, using the one or more cameras, the blockchain transaction record securely using a smart contract on a blockchain, wherein the smart contract is a self-executing code sent to an address on the blockchain as a transaction, and wherein the self-executing code is verified by that blockchain's consensus mechanism;

determine that the user account identified by one or more of the vehicle identification features matches a vehicle-user account stored in the computerized vehicle management system by comparing vehicle-identification features against a vehicle-user account database included in the computerized vehicle management system;

execute one or more actions with respect to the user account in the computerized vehicle management system; and responsive to executing the one or more actions with respect to the user account, transmit a confirmation identifier that causes an access control mechanism to activate at the geographic area permit access to the one or more parking locations by the vehicle.

3. The system of claim 2, wherein the at least one processor is further configured to:

determine that the vehicle is not associated with the user account stored in the computerized vehicle management system;

in response to determining the vehicle is not associated with the user account stored in the computerized vehicle management system, determine that the first location is within a threshold distance to a mobile user device associated with a user associated with the vehicle; and transmit a prompt to the mobile user device, wherein the prompt is configured to auto-fill one or more vehicle parameters into a user request to create a new user account in the computerized vehicle management system.

4. The system of claim 2, wherein the at least one processor is further configured to:

determine that the vehicle is not associated with the user account stored in the computerized vehicle management system; and in response to determining the vehicle is not associated with the user account stored in the computerized vehicle management system, enable a user associated with the vehicle to make a parking payment without creating the user account in the computerized vehicle management system.

5. The system of claim 2, wherein executing the one or more actions on the user account includes charging a fee to the user account.

6. The system of claim 2, wherein the first location is a refueling station or a charging station.

7. The system of claim 2, wherein the image data includes two or more images, each taken from different angles.

8. The system of claim 2, wherein the image data includes video clips captured by one or more security cameras installed within the geographic area.

9. The system of claim 2, wherein the edge processors are located locally to the geographical area to provide a shortened computing response time.

10. A non-transitory computer-readable storage medium comprising at least one instruction for causing a computer or processor to:

detect motion of an object at a first location associated with a geographic area using a motion sensor, the geographic area including one or more parking locations;

responsive to detecting the motion of the object at the first location, capture, using one or more cameras, image data associated with the first location;

extract, by a computer-vision model executing on one or more edge processors located within a threshold proximity to the one or more parking locations, one or more vehicle-identification features from the image data;

assign a session identifier to the extracted vehicle-identification features for an individual vehicle event, the session identifier uniquely identifying a vehicle entry or exit within the facility;

generate, for the session identifier, a blockchain transaction record including the extracted one or more vehicle-identification features, a timestamp, and location data;

transmit, using the one or more cameras, the blockchain transaction record securely using a smart contract on a blockchain, wherein the smart contract is a self-executing code sent to an address on the blockchain as a transaction, and wherein the self-executing code is verified by that blockchain's consensus mechanism;

determine that a user account identified by one or more of the vehicle-identification features matches a vehicle-user account stored in the computerized vehicle management system by comparing vehicle-identification features against a vehicle-user account database included in the computerized vehicle management system;

identify a user status associated with the user account;

select, from the one or more parking locations, a parking location based on the user status;

execute one or more actions with respect to the user account in the computerized vehicle management system; and responsive to executing the one or more actions with respect to the user account, transmit a confirmation identifier that causes an access control mechanism to activate at the geographic area permit access to the one or more parking locations by the vehicle.

11. The non-transitory computer-readable storage medium of claim 10, wherein the at least one processor is further configured to:

determine that the vehicle is not associated with the user account stored in the computerized vehicle management system;

in response to determining the vehicle is not associated with the user account stored in the computerized vehicle management system, determine that the first location is within a threshold distance to a mobile user device associated with a user associated with the vehicle; and transmit a prompt to the mobile user device, wherein the prompt is configured to auto-fill one or more vehicle parameters into a user request to create a new user account in the computerized vehicle management system.

12. The non-transitory computer-readable storage medium of claim 10, wherein the at least one processor is further configured to:

determine that the vehicle is not associated with the user account stored in the computerized vehicle management system; and in response to determining the vehicle is not associated with the user account stored in the computerized vehicle management system, enable a user associated with the vehicle to make a parking payment without creating the user account in the computerized vehicle management system.

13. The non-transitory computer-readable storage medium of claim 10, wherein executing the one or more actions on the user account includes charging a fee to the user account.

14. The non-transitory computer-readable storage medium of claim 10, wherein the first location is a refueling station or a charging station.

15. The non-transitory computer-readable storage medium of claim 10, wherein the image data includes two or more images taken from different angles.

16. The non-transitory computer-readable storage medium of claim 10, wherein the image data includes video clips captured by one or more security cameras installed within the geographic area.

17. The non-transitory computer-readable storage medium of claim 10, wherein the edge processors are located locally to the geographical area to provide a shortened computing response time.

18. The non-transitory computer-readable storage medium of claim 10, wherein the machine learning computer vision model is configured to determine one of the following vehicle specific parameters: color, make, year, model, size, weight, engine type, and fuel type.

* * * * *